United States Patent [19]
Koenck et al.

[11] Patent Number: 5,798,610
[45] Date of Patent: Aug. 25, 1998

[54] EFFICIENT ELECTROLUMINESCENT BACKLIGHT

[76] Inventors: Steven E. Koenck, 964 44th St., SE., Cedar Rapids, Iowa 52403; William Henry Keehn, II, 2630 Indian Creek Rd., Marion, Iowa 52302

[21] Appl. No.: 417,042

[22] Filed: Apr. 4, 1995

[51] Int. Cl.$^6$ .................................................. H01J 17/49
[52] U.S. Cl. ........................... 313/498; 362/84; 313/483
[58] Field of Search ............................. 313/498, 501, 313/483, 484, 485; 362/26, 30, 31, 84; 359/50, 49, 40, 41

[56] References Cited

U.S. PATENT DOCUMENTS

| | | | |
|---|---|---|---|
| 4,238,793 | 12/1980 | Hochstrate | 340/781 |
| 5,161,041 | 11/1992 | Abileah et al. | 359/40 |
| 5,304,895 | 4/1994 | Ujihara | 313/483 |
| 5,479,275 | 12/1995 | Abileah | 362/26 |

*Primary Examiner*—Sandra L. O'Shea
*Assistant Examiner*—Joseph Williams
*Attorney, Agent, or Firm*—Suiter & Associates,PC

[57] ABSTRACT

An efficient electrolumiescent light source for backlighting an LCD panel increases the intensity of light passing through the panel by concentrating light within that volume wherein the LCD panel is readable.

6 Claims, 2 Drawing Sheets

EFFICIENT ELECTROLUMINESCENT BACKLIGHT

TECHNICAL FIELD

The invention relates generally to electroluminescent backlighting devices and particularly to an electroluminescent backlight for a liquid crystal display (LCD).

BACKGROUND OF THE INVENTION

Advents in portable electronic devices have increased the utilization of liquid crystal displays (LCDs) for output displays. A liquid crystal display is a passive device in that it is not a source of light. Hence, a liquid crystal display requires a source of light in order to function. The light source may be ambient light incident upon the liquid crystal display which is reflected back to the viewer, or the light source may consist of some form of backlighting device which transmits light from the back of the display passing through the display toward the viewer. In environments in which ambient light is insufficient to illuminate the display thereby rendering the display unviewable or unreadable, backlighting is the primary means to illuminate the display.

An important characteristic determining the quality of a liquid crystal display is the viewing angle. The contrast of a liquid crystal display, the difference in intensity between an "off" pixel and an "on" pixel, generally has a maximum value at a viewing angle normal to the plane of the liquid crystal display. As the viewing angle moves away from the normal line, the contrast of the display is reduced until the viewing angle with respect to the normal line reaches a maximum value beyond which the display is no longer readable. The viewing angle maximum value defines a cone shaped volume of viewability within which the display is readable by the viewer and outside of which the display is unreadable.

Since the liquid crystal display is only viewable within a volume of display viewability defined by the maximum viewing angle with respect to a normal line, light from the backlight source impinging upon the display at an angle greater than the maximum viewability angle does not fall within the cone shaped volume of viewability and is thus wasted light. This wasted light is reflected off the back of the display or is absorbed therein. Because the electroluminescent panel consumes a large portion of the energy in a portable battery powered system, it is desirable to increase the efficiency of the electroluminescent backlight. A method for increasing the efficiency of the backlight is to redirect the rays of normally wasted light falling outside the cone of viewability so that they instead fall within and generally collinear with the cone of viewability.

Typically, a backlight device for a liquid crystal display panel consists of a planar sheet of material having a layer of electroluminescent material thereon. Light is emitted from the panel from a plurality of microscopic spherical point sources comprising the electroluminescent layer. Because the light is emitted from spherical point sources lying on a plane, the angle of illumination is 180° in all directions, or 90° from the normal line in all directions. Redirecting the light falling outside the cone of viewability to fall within the cone of viewability would yield an increase in the efficiency of the backlight panel.

SUMMARY OF THE INVENTION

Therefore, the object of the invention is to provide an electroluminescent panel for backlighting a liquid crystal display having a light output which concentrates illumination within the entire area of viewability of the liquid crystal display while minimizing illumination of areas outside of the cone of viewability. In obtaining the object of the invention the efficiency of the electroluminescent panel is thereby increased.

Other principle objects, features and advantages of the invention will become apparent from the following description and accompanying drawings, which set forth by way of illustration and example certain specific embodiments of this invention.

DETAILED DESCRIPTION

Figure 1:
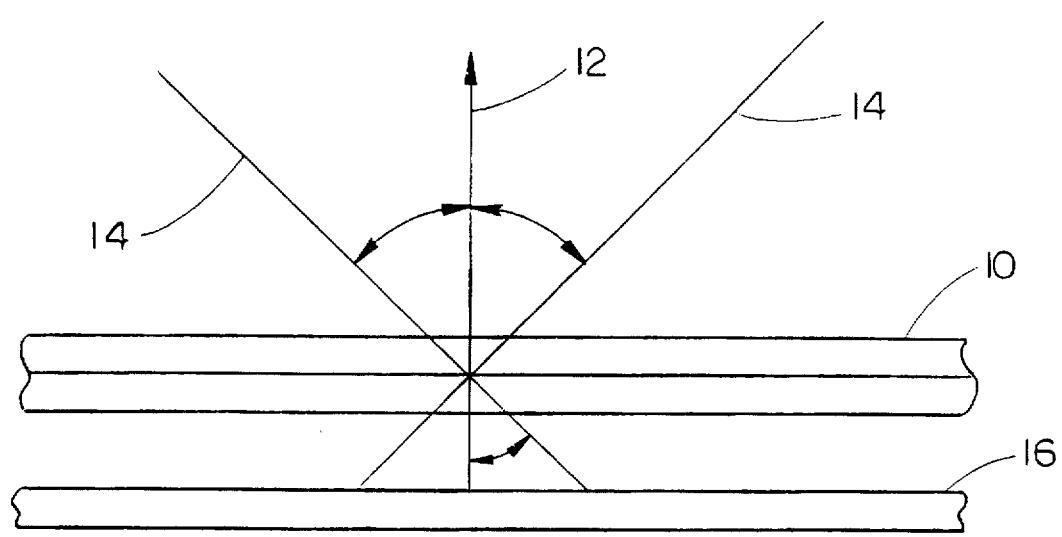
FIG. 1 illustrates a cone of viewability of a liquid crystal display.

FIG. 1 illustrates a cone of viewability of a liquid crystal display (LCD) panel as defined by the viewing angle from a line normal to a display panel. A liquid crystal display panel 10 exhibits maximum contrast from a viewing angle substantially coincident with a line 12 normal to the plane defined by the liquid crystal display panel 10. As the angle between the normal line 12 and the viewing angle increases, the contrast of the LCD generally decreases until a maximum angle alpha is reached beyond which the viewing angle the contrast of the LCD is such that the display is unreadable. The cone of viewability at any given point lying on the plane of an LCD panel may be defined by the locus of all lines 14 at an angle equal to or less than an angle alpha with respect to a line 12 normal to the plane of the LCD panel.

Thus, all photons of light emitted from an electroluminescent backlight 16 utilized as the primary light source for the liquid crystal display panel 10 must impinge upon the liquid crystal display panel 10 at an angle less than or equal to alpha in order to illuminate the LCD 10 within an area defined by the cone of viewability at any given point on the LCD 10. All other generated photons represent lost energy since they do not contribute to viewable light.

Figure 2:
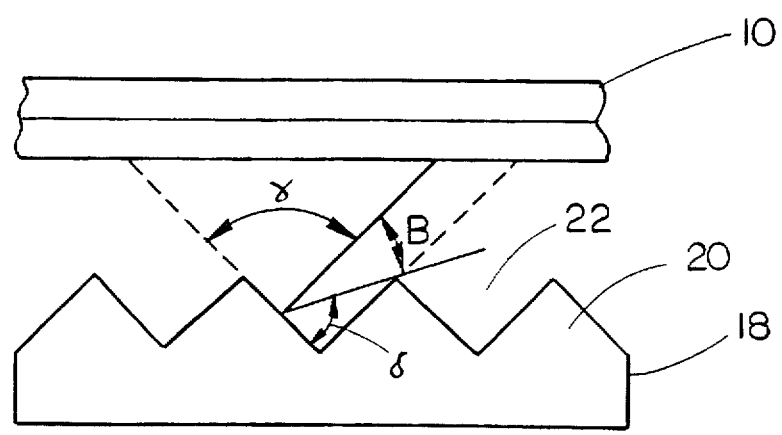
FIG. 2 is a side view representation of means for redirecting photons to travel within the cone of viewability.

FIG. 2 depicts a side view representation of the invention whereby photons generated by an electroluminescent panel 18 may be redirected to travel within the cone of viewability. An electroluminescent panel 18 is constructed having prismatic cell reflectors in the form of quadratic surface features 20 thereon. In an exemplary embodiment the quadratic surface features 20 are shaped so as to form spaces 22 similarly shaped as the cone of viewability characteristic to a particular LCD panel 10. The prismatic reflector 20 causes all photons travelling within the regions defined by angles gamma and delta to impinge upon the LCD panel 10 such that the photons travel within the cone of viewability at the point of impingement. Photons travelling within the region defined by angle gamma impinge directly upon the LCD panel 10 and photons travelling within the region delta are first redirected by reflection from surface feature 20 before impinging upon the LCD panel 10. Photons travelling within the region defined by angle beta are lost. Assuming a viewing angle alpha of 45° and a coefficient of reflectivity of unity, for photons emitted near the "peaks" of the quadratic surface features the redirected photons result in approximately a fifty percent gain in the illumination of the cone of viewability. The gain in illumination increases to approximately a one hundred percent gain in illumination for photons emitted at the "valleys" defined by the quadratic surface features 20. The gain in illumination is multiplied by the actual coefficient of reflectivity which is determined by construction materials and techniques. The quadratic surface features increase the total surface area of the electroluminescent panel 18 thereby increasing luminescent intensity output therefrom.

It will be apparent that many modifications and variations may be effected without departing from the teachings and concepts of the present disclosure.

What is claimed is:

1. An efficient electroluminescent light source for backlighting a liquid crystal display and the like comprising an electroluminescent panel having a multiplicity of photon point sources thereon for generating photons having a trajectory within a preferred volume.

2. The electroluminescent light source of claim 1 wherein said point sources are disposed on a quadratic surface.

3. The electroluminescent light source of claim 2 wherein said quadratic surface defines a volume substantially similar to said preferred volume.

4. The electroluminescent source of claim 1 further including a filter.

5. An efficient electroluminescent light source for backlighting a liquid crystal display and the like comprising a layer of a plurality of photon point sources for emitting beams of photons and means for directing the photons within a preferred volume.

6. An electroluminescent backlight device for illuminating a liquid-crystal display having a characteristic cone of viewability, the electroluminescent backlight device comprising:

an electroluminescent panel for generating photons to illuminate the liquid-crystal display, said electroluminescent panel having a first side facing toward the liquid-crystal display and a second side facing away from the liquid crystal display;

a plurality of quadratic surface features disposed on said first side of said electroluminescent panel, each of said plurality of quadratic surface features forming a prismatic cell reflector from which said photons impinging thereon may be reflected, said plurality of quadratic surface features forming spaces therebetween shaped substantially similar to the characteristic cone of viewability of the liquid-crystal display wherein at least one of said photons emitted from said electroluminescent panel impinging upon one of said prismatic cell reflectors is redirected within the characteristic cone of viewability.

* * * * *